(12) United States Patent
Koester et al.

(10) Patent No.: US 8,551,632 B2
(45) Date of Patent: Oct. 8, 2013

(54) BATTERY COOLING SYSTEM

(71) Applicants: Stephan Koester, Langerwehe (DE); Felix Girmscheid, Köln (DE); Andreas Emmerich, Aachen (DE); Jens Talmon, Köln (DE)

(72) Inventors: Stephan Koester, Langerwehe (DE); Felix Girmscheid, Köln (DE); Andreas Emmerich, Aachen (DE); Jens Talmon, Köln (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 13/622,444

(22) Filed: Sep. 19, 2012

(65) Prior Publication Data
US 2013/0071707 A1 Mar. 21, 2013

(30) Foreign Application Priority Data

Sep. 21, 2011 (DE) .......................... 10 2011 053 835
Aug. 7, 2012 (DE) ..................... 20 2012 102 969 U

(51) Int. Cl.
*H01M 2/14* (2006.01)
*H01M 2/18* (2006.01)

(52) U.S. Cl.
USPC .......................................................... 429/72

(58) Field of Classification Search
None
See application file for complete search history.

(56) References Cited

U.S. PATENT DOCUMENTS

| | | | | |
|---|---|---|---|---|
| 3,622,397 | A | * | 11/1971 | Belove .............................. 429/55 |
| 4,828,939 | A | * | 5/1989 | Turley et al. ................... 429/405 |
| 6,087,036 | A | * | 7/2000 | Rouillard et al. ................ 429/66 |
| 6,933,076 | B2 | | 8/2005 | Ura et al. |
| 2007/0009787 | A1 | * | 1/2007 | Straubel et al. ................. 429/99 |
| 2012/0107663 | A1 | | 5/2012 | Burgers et al. |

FOREIGN PATENT DOCUMENTS

| | | |
|---|---|---|
| DE | 102008059953 A1 | 6/2010 |
| DE | 102010029872 A1 | 1/2011 |
| DE | 102010032901 A1 | 2/2012 |
| DE | 102010038600 A1 | 2/2012 |
| EP | 2337142 A1 | 6/2011 |
| WO | 2011116801 A1 | 9/2011 |

* cited by examiner

*Primary Examiner* — Patrick Ryan
*Assistant Examiner* — Jose Colucci Rios
(74) *Attorney, Agent, or Firm* — Fraser Clemens Martin & Miller LLC; J. Douglas Miller

(57) ABSTRACT

A battery cooling system includes a battery and a plurality of battery cooler pipes disposed adjacent the battery. Each of the battery cooler pipes is spaced apart and substantially parallel to an adjacent one of the battery cooler pipes. A clamping element is disposed adjacent at least one of the battery cooler pipes. The clamping element configured to urge the battery cooler pipes against at least a portion of the battery. The clamping element includes a plurality of clamping wings extending outwardly from a center portion of the clamping element. Each of the clamping wings of the clamping element is disposed adjacent at least one of the battery cooler pipes. The battery cooling system may further include a carrier disposed adjacent the center portion of the clamping element to absorb spring forces of the clamping wings.

19 Claims, 2 Drawing Sheets

BATTERY COOLING SYSTEM

CROSS-REFERENCE TO RELATED APPLICATION

This application claims the benefit of German Provisional Patent Application No. DE 10 2011 053 835.6 filed Sep. 21, 2011 and German utility Patent Application No. DE 20 2012 102 969.3 filed Aug. 7, 2012, the entire disclosures of which are hereby incorporated herein by reference.

FIELD OF THE INVENTION

The invention relates to a battery cooling system provided with a battery cooler pipe that for improved thermal contact is forced against a battery or a battery module of a motor vehicle, exerting a homogeneous contact force.

BACKGROUND OF THE INVENTION

In electric energy stores, devices for a voltage supply of motor vehicles such as electro vehicles or hybrid vehicles, usually known as batteries. In most cases, a plurality of battery modules is employed that use electrochemical principles of oxidation with an electrolyte, thereby producing heat losses.

A stack of individual battery modules is clamped, oftentimes, over a mechanical end plate and tie-rods to build the energy store. In addition to mechanical fixation of the modules to each other, the end plates and the tie-rods serve to counteract deformations caused by gas pressure changes occurring when operating the battery modules.

Battery modules require cooling in order to ensure the necessary operational temperature. Typically, excess heat is dissipated via a heat exchanger, also known as battery cooler. In hybrid vehicles, the battery cooler can be connected to a coolant circuit of an engine, and in electro vehicles, the battery cooler can be connected to a refrigerant circuit of an HVAC system.

In prior art, the battery coolers, or battery cooler pipes, respectively, are directly bonded to the batteries or forced against the battery modules over a battery casing.

In DE 102010038600 A1, for example, a cooling system for a battery module is described. The cooling system is provided with a spring system that forces the cooling system flat against a bottom of the battery module. The spring system is arranged between a battery casing and the cooling system, and supported against a bottom of the battery casing.

In EP 2337142 A1 a cooling system for a battery module is described. The cooling system includes a flat contact plate. The contact plate is resilient and pre-stressed, urging the contact plate against a bottom of the battery.

In DE 102010029872 A1 a cooling system for a battery module is described. The cooling system includes several clamping elements which force a flat cooling body to a bottom of the battery modules.

Generally, the current concepts for forcing the battery cooler to the battery modules require significant installation space are very heavy, strongly contributing to a total weight of the battery.

It is an objective of the invention to produce a simple, lightweight, and cost-effective battery cooling system, which is capable of cooling the battery modules while minimizing a required installation space.

SUMMARY OF THE INVENTION

In concordance and agreement with the present disclosure, a simple, lightweight, and cost-effective battery cooling system, which is capable of cooling the battery modules while minimizing a required installation space, is surprisingly discovered.

The problem of known cooling systems is solved by a battery cooling system of the present invention that includes a battery, two battery cooler pipes, and a clamping element that forces the battery cooler pipes against the battery for thermal contact. In certain embodiments, the battery cooler pipes are substantially parallel, distanced to each other and longitudinally arranged at the battery, when the battery is substantially rectangular-shaped. The clamping element is configured as a center portion and two clamping wings extending from both sides of the center portion. Each clamping wing contacts a battery cooler pipe in longitudinal extension. In this way the battery cooler pipe, to a preferred embodiment configured as a flat pipe, is over its whole length forced against the battery and, appropriate forcing provided, the heat loss of the battery can be absorbed over a relatively large surface of the flat pipes.

In order to achieve a homogeneous clamping force over the total longitudinal extension of the battery cooler pipes, the center portion of the clamping element, from which the clamping wings extend, is preferably provided with a reinforcement element.

This reinforcement element in longitudinal extension is advantageously configured as beads or ribs.

The clamping element is advantageously configured as a spring sheet formed from a metallic material.

According to an advantageous embodiment of the invention, the clamping element is directly connected reversibly by form and force closure to the battery at the center portion by means of a bolt connection. Alternatively, the casing provides form-closed guiding, and a cell bolting provides a pressing together.

Since the individual energy store cells can be bolted to the battery cooler during preassembly, an effort exerted during final assembly is relatively low.

The clamping element is preferably thermally insulated against the battery cooler pipe in order to prevent undesired heat from being input over the clamping element. If the clamping element is directly connected to the battery, additional heat transfer from the battery over the clamping element to the battery cooler pipes can be desired, with heat then being input into the battery cooler pipes from one side directly from the battery and from the other side indirectly over the clamping elements.

According to a preferred embodiment of the invention, the clamping element has a length of between about 150 mm and about 400 mm, adapted to the length of the battery.

A thickness of the clamping element formed from a sheet material is between about 0.3 mm and about 1.0 mm.

Preferably, the clamping element is held at a rigid carrier for stiffening, with the carrier having a material thickness of between about 6 mm and about 10 mm.

Alternatively, a pre-cambered carrier can be used that is on assembly deformed in a defined manner. In this case, the material thickness can be less than about 6 mm.

The carrier can also be part of the battery casing such as a rib supported by the spring sheet.

A preferred embodiment of the invention is that the carrier is provided with a pre-cambering for stiffening. Therefore, the carrier has a material thickness of less than about 6 mm.

According to an advantageous further embodiment of the invention the rigid carrier is established in the casing structure of the battery.

Preferably, the concept of the invention is established by a clamping element made of metal sheet that over a defined deformation causes a contact force from the battery cooler onto the battery, or the battery modules, respectively. According to technological requirements, the spring characteristics can be adjusted in accordance with Hooke's law via material characteristics, material thickness, and form design of the clamping element.

For large tolerances of the installation space and the battery modules it can be advantageous to plastically deform the spring sheet on the first assembly, or deliberately allow a plastic deformation, respectively.

In this way, stamping according to the installation space occurs.

To use the clamping element over long spans without an additional support, the center portion is reinforced. For short spans, reinforcement can be made through beads or ribs formed in the sheet.

For spans longer than about 200 mm, an additional reinforcement by a separate carrier is advantageous. Using an additional carrier allows more exact adaptation of a spring characteristic of the spring sheet to the contact forces.

In an advantageous embodiment of the invention, the clamping wings of the clamping element with slits normal to the longitudinal axis are provided. So individual sections are formed that are flexible independent of each other. The flat pipes being highly flexible adapt very well to surface irregularities of the batteries. The individual flexible sections of the clamping wings act as single springs, thereby leading to an even better adaptation of the flat pipes to the battery surface.

In the invention, the advantages of a very low weight and little installation space, combine with a possibility to realize, also for relatively large dimensional tolerances of the components, constant forcing of the battery cooler pipes to the battery.

In one embodiment, a battery cooling system, comprises: a battery; at least one battery cooler pipe disposed adjacent the battery; and a clamping element configured to urge the at least one battery cooler pipe against at least a portion of the battery, wherein the clamping element includes a center portion having at least one clamping wing extending outwardly therefrom, and wherein the at least one clamping wing is disposed adjacent the at least one battery cooler pipe.

In another embodiment, a battery cooling system, comprises: a battery; a plurality of battery cooler pipes disposed adjacent the battery, wherein each of the battery cooler pipes is spaced apart from and substantially parallel to an adjacent one of the battery cooler pipes; and a clamping element configured to urge the battery cooler pipes against at least a portion of the battery, wherein the clamping element includes a plurality of clamping wings extending outwardly from a center portion of the clamping element, and wherein each of the clamping wings includes a substantially planar end portion disposed adjacent at least one of the battery cooler pipes.

In yet another embodiment, a battery cooling system, comprises: a battery; a plurality of battery cooler pipes disposed adjacent the battery, wherein each of the battery cooler pipes is spaced apart from and substantially parallel to an adjacent one of the battery cooler pipes; a clamping element configured to urge the battery cooler pipes against at least a portion of the battery, wherein the clamping element includes a plurality of clamping wings extending outwardly from a center portion of the clamping element, and wherein each of the clamping wings is disposed adjacent at least one of the battery cooler pipes; and a carrier disposed adjacent the center portion of the clamping element, wherein the carrier is configured to absorb spring forces of the clamping wings.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
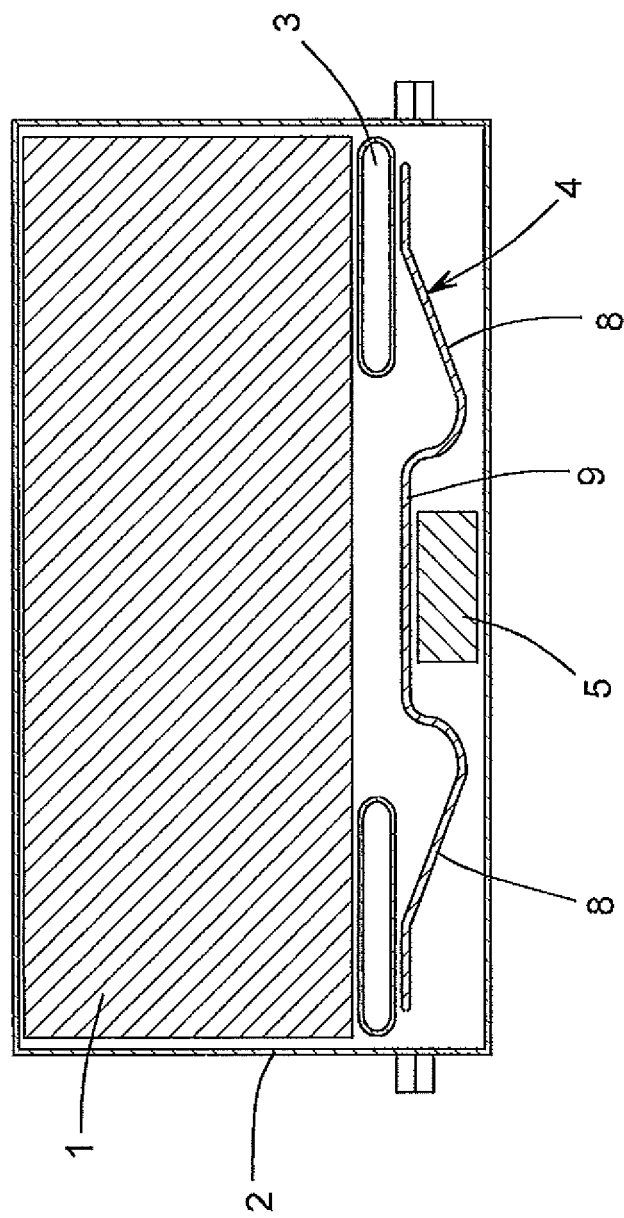
FIG. 1 is a schematic cross-sectional view of a battery cooling system according to the present invention.

FIG. 1 shows a battery cooling system in cross-sectional view. The cross-sectional image shows a fundamental structure of the battery cooling system, wherein a clamping element 4 shown is a spring sheet 4 that urges battery cooler pipes 3 against a battery or battery modules 1. During installation of the battery modules 1, the battery cooler pipes 3, and the spring sheet 4 into the battery casing 2, the spring sheet 4 is pre-stressed. A pre-stressing of the spring sheet 4 ensures a constant urging in a longitudinal direction of the battery cooler pipes 3 towards the battery 1.

When a length of the spring sheet 4 spans more than 200 mm, the particular embodiment of the invention shown is advantageous due to an additional reinforcement of the spring sheet 4 in longitudinal direction by a separate rigid carrier 5. The spring sheet 4 includes a center portion 9 fixed to the carrier 5 for absorbing spring forces of clamping wings 8 of the spring sheet 4. The carrier 5 is connected to the battery casing 2, transferring the spring forces to the battery casing 2. Alternatively, the spring forces can be introduced into the casing 2 via the carrier 5.

In certain embodiments, the battery cooler pipes 3 are substantially flat pipes so that a surface in thermal contact with the battery modules 1 is relatively large. The spring sheet 4 has a substantially W-shaped cross-section. The clamping wings 8 are outer legs of the spring sheet 4 having substantially planar end portions so that the clamping wings 8 rest flat on the battery cooler pipes 3. Therefore, the battery cooler pipes 3, which are relatively sensitive to mechanical loads, are not damaged by the spring forces and possible relative motions of the sharp-edged clamping wings 8 of the spring sheet 4. Moreover, homogeneous and directed force transmission to the flat pipes 3 is ensured.

Figure 2:
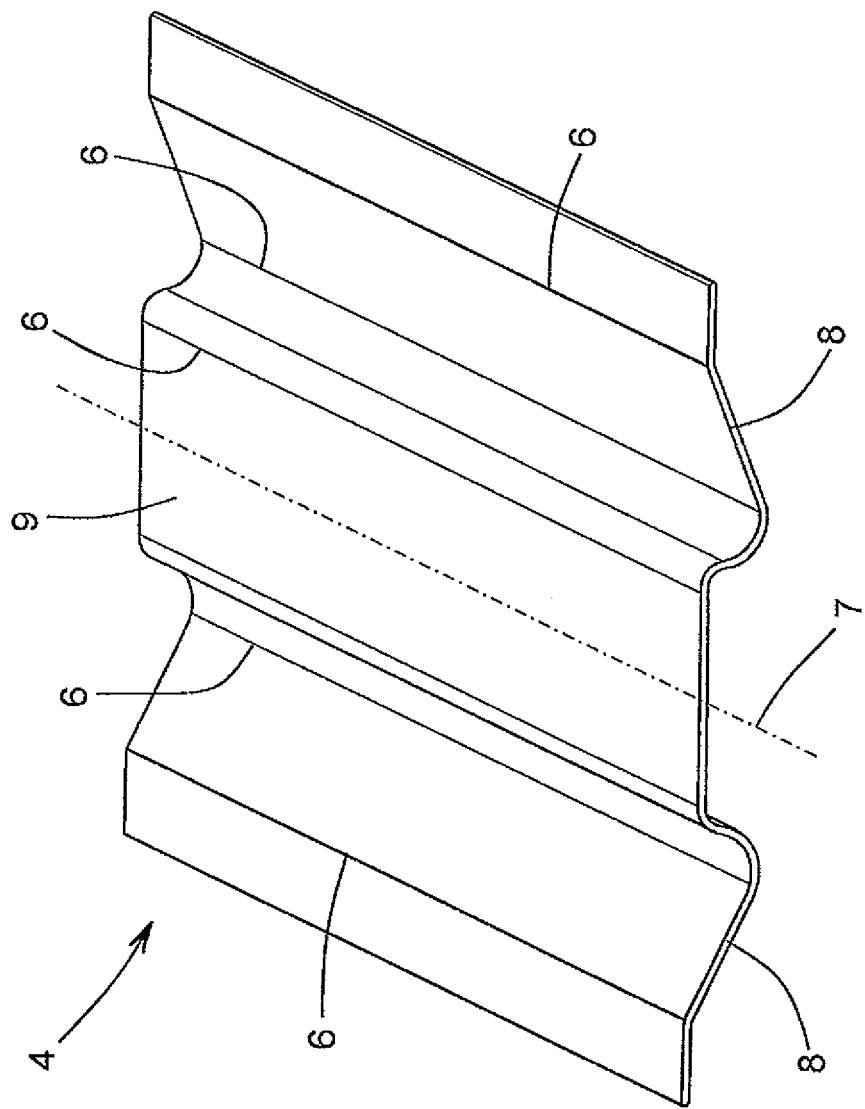
FIG. 2 is a schematic perspective view of a clamping element of the battery cooling system illustrated in FIG. 1.

FIG. 2 shows an embodiment of the spring sheet 4 including reinforcement elements formed on both sides of the longitudinal axis 7. The spring sheet 4 illustrated in FIG. 2 includes a center portion 9 having clamping wings 8 formed on both sides thereof. The spring sheet 4 shown is formed from one-part of a sheet that is appropriately formed and heat-treated. A cross-section of the spring sheet 4 is substantially mirror-symmetrical so that the clamping wings 8 each develop a contact force in an upward direction. The reinforcement elements are formed as beads or ribs 6 in the spring sheet 4 substantially parallel to the longitudinal axis 7 of the spring sheet 4.

While certain representative embodiments and details have been shown for purposes of illustrating the invention, it will be apparent to those skilled in the art that various changes may be made without departing from the scope of the disclosure, which is further described in the following appended claims.

NOMENCLATURE 1 battery, battery module
2 battery casing
3 battery cooler pipes, flat pipes
4 clamping element, spring sheet
5 rigid carrier
6 beads, ribs
7 longitudinal axis
8 clamping wings
9 center portion

The invention claimed is:

1. A battery cooling system, comprising: a battery; at least one battery cooler pipe disposed adjacent the battery; and a clamping element configured to urge the at least one battery cooler pipe against at least a portion of the battery, wherein the clamping element includes a center portion spaced apart from the at least one battery cooler pipe, the center portion having at least one clamping wing extending outwardly therefrom, wherein the at least one clamping wing is disposed adjacent the at least one battery cooler pipe, and wherein the clamping element is thermally insulated against the battery cooler pipe.

2. The battery cooling system of claim 1, wherein the center portion of the clamping element includes at least one reinforcement element formed thereon.

3. The battery cooling system of claim 2, wherein the at least one reinforcement element is at least one of a bead and a rib.

4. The battery cooling system of claim 1, wherein the clamping element is a spring sheet.

5. The battery cooling system of claim 1, wherein the clamping element is formed from a metallic material.

6. The battery cooling system of claim 1, wherein the clamping element is reversibly connected to the battery at the center portion by a bolt connection.

7. The battery cooling system of claim 1, wherein the clamping element has a length in a range of about 150 mm to about 400 mm.

8. The battery cooling system of claim 1, wherein the clamping element has a thickness in a range of about 0.3 mm to about 1.0 mm.

9. The battery cooling system of claim 1, further comprising a carrier to support the clamping element.

10. The battery cooling system of claim 9, wherein the carrier has a material thickness in a range of about 6 mm to about 10 mm.

11. The battery cooling system of claim 9, wherein the carrier is pre-camber for stiffening and has a thickness of less than 6 mm.

12. The battery cooling system of claim 9, wherein the carrier is formed in a casing of the battery.

13. The battery cooling system of claim 1, wherein the at least one clamping wing includes at least one slit formed therein, and wherein the at least one slit is formed substantially perpendicular to a longitudinal axis of the at least one clamping wing to divide the at least one clamping wing into individual sections that are flexible independently of each other.

14. The battery cooling system of claim 1, wherein the clamping element has a substantially W-shaped cross-section.

15. The battery cooling system of claim 1, wherein the at least one clamping wing includes a substantially planar end portion.

16. A battery cooling system, comprising: a battery; a plurality of battery cooler pipes disposed adjacent the battery, wherein each of the battery cooler pipes is spaced apart from and substantially parallel to an adjacent one of the battery cooler pipes; and a clamping element configured to urge the battery cooler pipes against at least a portion of the battery, wherein the clamping element includes a plurality of clamping wings extending outwardly from a center portion of the clamping element, wherein the center portion is spaced apart from the battery cooler pipes and each of the clamping wings includes a substantially planar end portion disposed adjacent at least one of the battery cooler pipes, and wherein the clamping element is thermally insulated against the battery cooler pipe.

17. The battery cooling system of claim 16, wherein the center portion of the clamping element includes at least one reinforcement element formed thereon.

18. The battery cooling system of claim 16, wherein at least one the clamping wings includes at least one slit formed therein, and wherein the at least one slit is formed substantially perpendicular to a longitudinal axis of the clamping wing to divide the clamping wing into individual sections that are flexible independently of each other.

19. A battery cooling system, comprising: a battery; a plurality of battery cooler pipes disposed adjacent the battery, wherein each of the battery cooler pipes is spaced apart from and substantially parallel to an adjacent one of the battery cooler pipes; a clamping element configured to urge the battery cooler pipes against at least a portion of the battery, wherein the clamping element includes a plurality of clamping wings extending outwardly from a center portion of the clamping element, wherein each of the clamping wings is disposed adjacent at least one of the battery cooler pipes, and wherein the clamping element is thermally insulated against the battery cooler pipe; and a carrier disposed adjacent the center portion of the clamping element opposite the battery, wherein the carrier is configured to absorb spring forces of the clamping wings.

* * * * *